June 13, 1967  A. E. GEISER ETAL  3,324,786
GRAPE COOLER AND FIELD PACKER

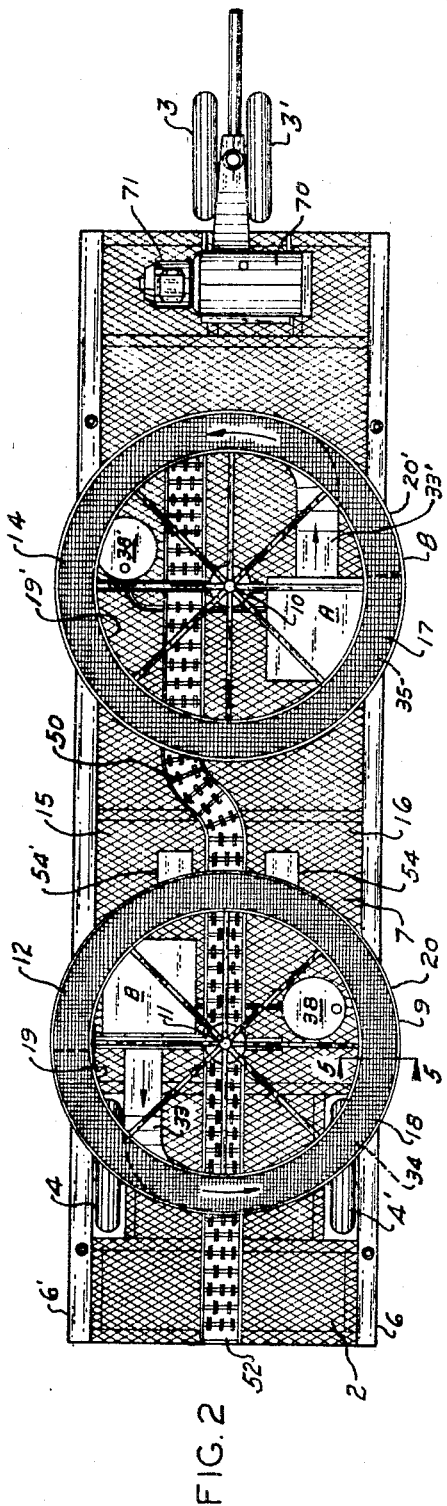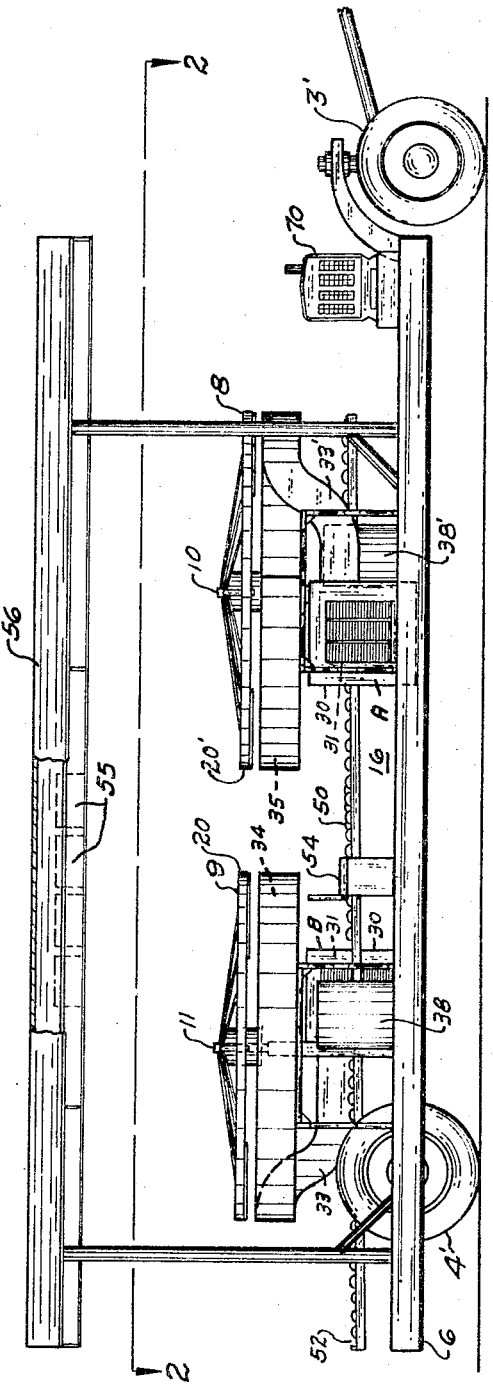

Filed Nov. 13, 1964  3 Sheets-Sheet 2

INVENTORS
ALWYN E. GEISER AND
LORIN L. McCARTHY.
BY Scott L. Tjornsel
Atty

June 13, 1967   A. E. GEISER ETAL   3,324,786
GRAPE COOLER AND FIELD PACKER

Filed Nov. 13, 1964   3 Sheets-Sheet 3

INVENTORS
ALWYN E. GEISER AND
BY LORIN L. McCARTHY.
Scott L. Nowles
atty.

United States Patent Office 3,324,786
Patented June 13, 1967

3,324,786
GRAPE COOLER AND FIELD PACKER
Alwyn E. Geiser, 3210 N. 48th Drive 85018, and Lorin L. McCarthy, 6226 W. Verde Lane 85033, both of Phoenix, Ariz.
Filed Nov. 13, 1964, Ser. No. 410,864
7 Claims. (Cl. 99—239)

This invention concerns a grape cooler and field packer.

One of the objects of the invention is to provide a machine having mechanism to receive freshly harvested grapes and cool them with the minimum loss of moisture and place them in a position where they can be boxed for shipment.

Another object of the invention is to provide a grape handling machine which will receive grapes directly from the vines after the bunches have been cut from the vines and hold them in a draft of cool moist air until the bunches of grapes are cooled to approximately the wet bulb temperature as it exists under the climatic conditions of the ambient air of the vineyard.

Another object concerns a movable wheeled vehicle adapted to traverse a vineyard between the rows of grape vines and receive grapes from the vines immediately after they have been harvested and cool them so that there will be a minimum loss of juice from the stems; said cooling being done in a moist but not excessively damp draft of air provided by the machine and mechanism which will move the grapes to a position where they can be cleaned and spoiled grapes, stems and leaves removed while they are being cooled, and thereafter move the grapes to a position where they can be packed into pack-out boxes for shipping.

Other objects will appear hereinafter.

I attain the foregoing objects by means of the devices, parts and combinations of parts as shown in the accompanying drawings, in which—

FIGURE 1 is a side elevational view of the machine herein concerned with certain parts shown in section;

FIGURE 2 is a plan view of the machine taken on line 2—2 of FIGURE 1;

Similar numerals refer to similar parts in the several views.

Figure 3:
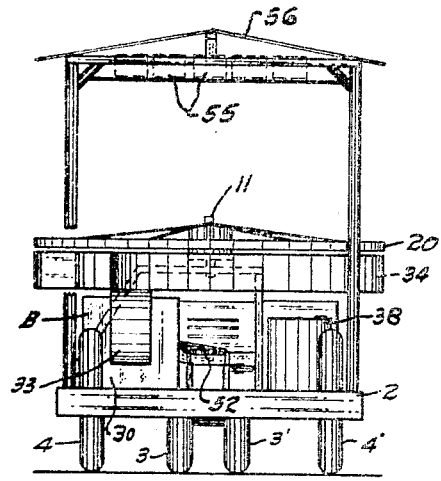
FIGURE 3 is a rear view thereof.
Figure 4:
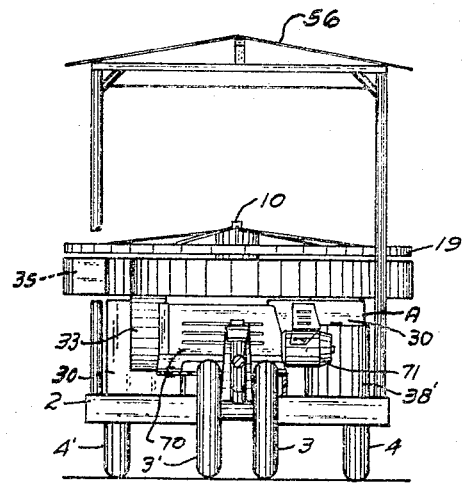
FIGURE 4 is a front view thereof.
Figures 5, 6:
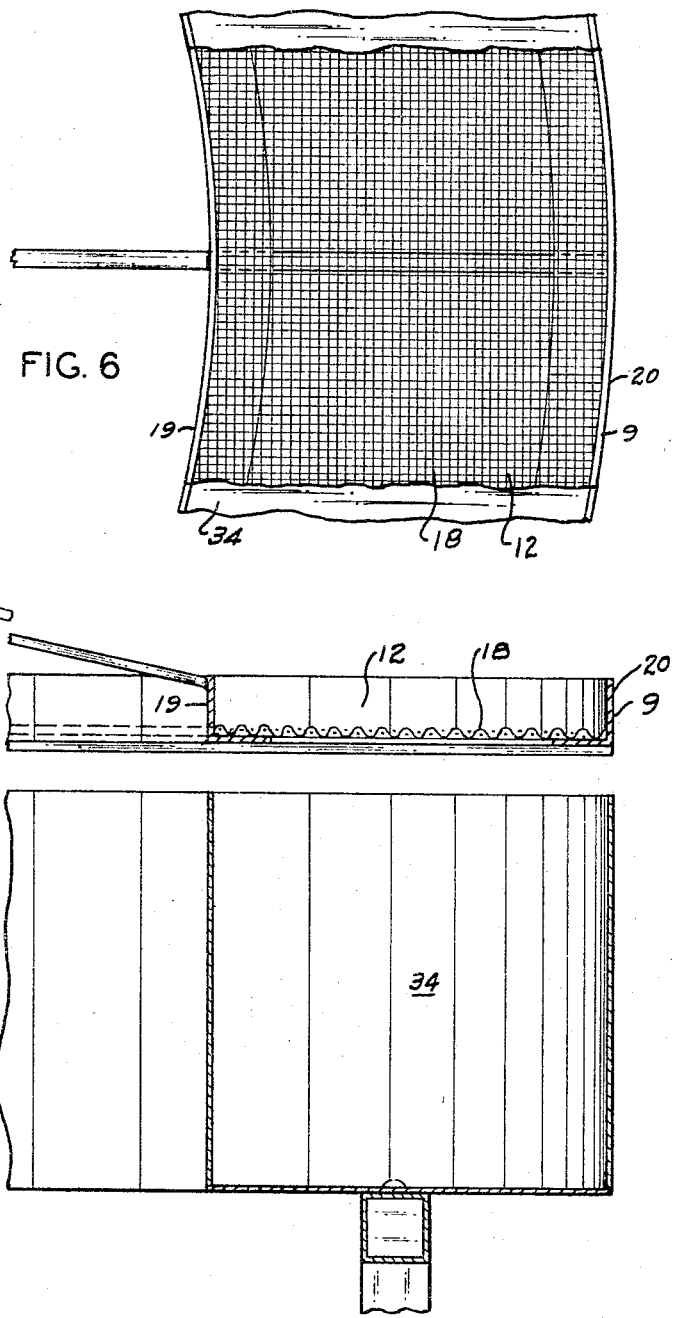
FIGURE 5 is a sectional view of a fragment of the machine as indicated on line 5—5 of FIGURE 2, and drawn on a greatly enlarged scale.
FIGURE 6 is a fragmental part of one of the cooling wheels and annular discharge duct.

The machine consists broadly of a platform 2 which is supported on steerable front riding wheels 3 and 3', and nonsteerable rear riding wheels 4 and 4'. The right hand wheels are indicated by the primed numbers.

On platform 2, and supported by the side longitudinal members 6 and 6' there is a covering of metal grating 7. This serves as a working and storage platform, as will be hereinafter explained.

Along the longitudinal center of platform 2 there are cooling wheels 8 and 9 which rotate on vertical shafts 10 and 11, respectively. Each of the wheels is provided with an annular trough, marked 12 and 14, respectively. The axes of the two wheels are disposed along a center line which approximates the longitudinal center of platform 2. The shafts are spaced apart along this center line.

Portions of areas of the grating between the two cooling wheels, indicated by numerals 15 and 16, are used to support workers who handle the grapes placed in the annular troughs 12 and 14 on the wheels. Areas 15 and 16 are closely adjacent to the peripheries of wheels 8 and 9.

The bottoms 17 and 18 of each annular grape receiving and cooling trough are of plastic woven screen. This type of bottom provides ventilation for grapes lying in the trough and at the same time the grapes will not be bruised or likely to be damaged by the elements constituting the trough. The sides 19 and 20 and 19' and 20' of the troughs are approximately four inches to six inches high and merely confine the bunches of picked grapes and hold them on the bottoming screens, just mentioned.

Beneath each of the cooling wheels there are evaporative coolers A and B of the type commonly known in the southwest portion of the United States as "wet air" coolers. These are composed of an outside case 30 which contains a centrifugal blower 31 arranged to draw air through evaporating pads in the side walls of each cooler and pick up moisture from evaporative excelsior pads included in the side walls. A centrifugal blower sucks air through the pads of each cooler and discharges it through exhaust pipes 33 and 33'. This exhaust air issues from an annular duct 34 for the rear blower and 35 for the forward blower. The top of each of said ducts is open. A draft of moistened air flows tangentially into each duct to produce a rotary motion and upward through the plastic screened bottoms of the two annular troughs. The draft of moist air flowing in a rotary manner from the exhaust of the coolers strikes portions of wheels 8 and 9 and is sufficient to rotate the cooling wheels at a slow to medium rate of speed and this causes the wheels to turn as soon as the coolers are set in operation.

As shown in FIGURE 2, tanks 38 and 38' provide water for moistening the pads in coolers adjacent to which they are positioned. These tanks are filled periodically during operation.

The roller conveyor 50 is positioned to receive and convey pack-out boxes for grapes from the central portion of platform 2 to its left end. These pack-out boxes 55, after being weighed on scales 54 and 54', are placed on the conveyor 50 as the grapes are loaded into them from the cooling wheels.

The pack-out boxes are temporarily stored in the roof cover 56 and later loaded at positions adjacent to the work areas 15 and 16 onto the conveyor 50. The pack-out boxes are delivered at the end 52 of the conveyor and are later loaded with the cooled grapes and then stacked on either side of frame 2, adjacent the conveyor.

At the front end portion of the frame there is an engine 70 which operates a generator 71 to furnish electricity to operate the blower motors in each of the coolers. Controls of the engine, generator and motors are placed at convenient positions (not shown) adjacent the picking areas 15 and 16. The platform is moved by a suitable tractor (not shown) attached to the steerable wheels 3 and 3'.

In use the machine is towed by any suitable towing vehicle between rows of grape vines in the vineyard. Workers standing the areas 15 and 16, respectively, remove grape bunches from the vines and place them in the annular troughs of the wheels. As the bunches rotate in the annular troughs on the wheels, they are cooled and then are picked up by workers standing in areas 15 and 16 and placed in pack-out boxes in these areas.

We claim:

1. In a grape cooling mechanism, for cooling freshly picked grapes, a mobile flat bed vehicle having a platform thereon with a perforate top, a pair of fore and aft cooling and drying wheels rotatably mounted on vertical axles on said bed, said wheels having annular grape receiving and cooling troughs, annular grape receiving troughs with perforate screened bottoms, journalled on said shafts, wet air blower coolers mounted on said bed below said wheels; annular outlet ducts receiving air drafts tagentially from said blowers to produce rotary air drafts from the top of each duct; said platforms having loading and unloading areas centrally positioned and adjacent said wheels on said platform; and motive means connected with and operating said blowers.

2. The device as described in claim 1 in combination with a roller conveyor centrally disposed on said platform on said bed and adapted to convey pack-out boxes of grapes from the central loading position to one end of said platform.

3. The device described in claim 1 wherein a roof shade is disposed above said platform and means are provided therein for temporarily holding pack-out boxes prior to their being filled with grapes.

4. The device as described in claim 1 wherein towing means are provided at the front of said bed.

5. A grape harvester and dryer comprising a wheeled steerable platform with means for trailing at one end, including a steering tongue, steering wheels at said end and riding wheels at the opposite end; said platform consisting of a perforate bed having centrally aligned erect bearing tubes and in spaced relation positioned along said center line of said platform; cooling and conditioning wheels for harvested grapes journalled on bearngs on said tubes to revolve in a horizontal plane, said wheels having rims composed of annular troughs to receive harvested grapes, having perforate plastic bottoms; a pair of wet air coolers disposed on said wheeled platform below each of said wheels, each cooler having a blower with a discharge pipe directed tangentially into an annular discharge vent to produce rotary air motion therein; harvesting and loading stations on said platform; means for operating the blowers in said coolers; said means including a prime mover on said platform; said annular discharge vents being disposed below said annular trough to induce rotary motion thereof from said trough and conveyor means for moving cooled grapes from areas of said rotary wheel annular troughs and relative to said platform.

6. The device described in claim 5, hereinabove, wherein there is at least one rotary cooling and treatment wheel on said platform.

7. The device described in claim 5 wherein a conveyor is positioned on said platform to convey grapes from said cooling wheel annular rims to a selected position in the back portion of said mobile platform.

References Cited

UNITED STATES PATENTS

| 230,573 | 7/1880 | Renz | 99—239 |
|---------|--------|------|--------|
| 467,641 | 1/1892 | Marshfield | 99—239 |

FOREIGN PATENTS 644,225  7/1962  Canada.

WALTER A. SCHEEL, *Primary Examiner.*

R. W. JENKINS, *Assistant Examiner.*